(12) United States Patent
Shino

(10) Patent No.: US 6,643,468 B1
(45) Date of Patent: Nov. 4, 2003

(54) OPTICAL COMMUNICATION SYSTEM, OPTICAL TRANSMITTING APPARATUS, OPTICAL RECEIVING APPARATUS, OPTICAL COMMUNICATION METHOD, AND STORAGE MEDIUM

(75) Inventor: Kuninori Shino, Tokyo (JP)

(73) Assignee: Sony Corporation, Tokyo (JP)

( * ) Notice: Subject to any disclaimer, the term of this patent is extended or adjusted under 35 U.S.C. 154(b) by 576 days.

(21) Appl. No.: 09/606,553

(22) Filed: Jun. 29, 2000

(30) Foreign Application Priority Data

Jul. 16, 1999 (JP) .......................................... 11-203698

(51) Int. Cl.[7] ............................................. H04B 10/00
(52) U.S. Cl. ........................ 398/140; 398/79; 398/141; 398/91; 398/147; 398/148; 398/182; 398/186; 398/200; 398/195
(58) Field of Search .................... 398/79, 140, 141, 398/91, 147, 148, 182, 186, 200, 195

(56) References Cited

U.S. PATENT DOCUMENTS

| | | | | |
|---|---|---|---|---|
| 6,011,638 A | * | 1/2000 | Mamyshev et al. | 359/179 |
| 6,122,088 A | * | 9/2000 | Hasegawa | 359/188 |
| 6,233,387 B1 | * | 5/2001 | Berkey et al. | 385/123 |
| 6,323,976 B1 | * | 11/2001 | Nogiwa | 359/133 |
| 6,327,061 B1 | * | 12/2001 | Desurvire | 359/124 |
| 6,407,841 B1 | * | 6/2002 | Golovchenko et al. | 359/161 |
| 6,411,408 B1 | * | 6/2002 | Dennis et al. | 359/124 |

* cited by examiner

Primary Examiner—Leslie Pascal
Assistant Examiner—Hanh Phan
(74) Attorney, Agent, or Firm—Sonnenschein, Nath & Rosenthal LLP

(57) ABSTRACT

The invention provides an optical communication system, an optical transmitting apparatus, an optical receiving apparatus, an optical communication method, and a storage medium, in which a large-capacity transmission can be performed at high speed and multiplexing efficiency can be improved. The optical communication system includes an optical transmitting apparatus and an optical receiving apparatus connected via a transmitting medium having anomalous dispersion characteristics. In this system, the optical transmitting apparatus converts a plurality of information signals output from a plurality of signal sources into light signals having amplitudes different according to the respective information signals to output the light signals LP, by providing an individual specified optical intensity capable of performing an optical soliton transmission. The optical receiving apparatus has a function of demodulating the light signals LP input via the transmitting medium by identifying the corresponding information signal according to the magnitude of the amplitude to demodulate the plurality of the information signals.

6 Claims, 7 Drawing Sheets

311

312

313

314

312

316

OPTICAL COMMUNICATION SYSTEM, OPTICAL TRANSMITTING APPARATUS, OPTICAL RECEIVING APPARATUS, OPTICAL COMMUNICATION METHOD, AND STORAGE MEDIUM

BACKGROUND OF THE INVENTION

1. Field of the Invention

The present invention relates to optical communication systems, optical transmitting apparatuses, optical receiving apparatuses, optical communication methods, and storage mediums. More particularly, the invention relates to optical multiplexing transmissions.

2. Description of the Related Art

Optical-fiber communication systems, which permit broadband and long-distance transmissions, are widely used for trunk-line communications in telephone-line networks and data transmission circuit networks. Conventionally, telephone lines for voice communications have mainly been used in communication services. However, with the recent expanding proliferation of the Internet, data communications are now on the rapid increase, and the amount of its use is even beginning to exceed telephone traffic.

Probably, in the future, such a tendency is being more accelerated, and the capacities of trunk lines, on which communications intensively concentrate, are becoming increasingly larger. Thus, similarly, in access networks connected to trunk line networks, there is a growing need for high-speed optical communication systems with large data transmission capacities.

Regarding the optical communication systems, there are provided two communication methods for meeting such increasing communication needs.

One of the methods is referred to as a wavelength division multiplex (WDM) system, which permits a large-capacity transmission. More specifically, in the WDM transmission system, a plurality of light signals having different wavelengths is transmitted through a single optical fiber. With this system, broadband low-loss characteristics of the optical fiber are effectively utilized to achieve the large-capacity transmission.

The other method is referred to as an optical soliton transmission system. An optical soliton is one mode of a light signal transmitted through an optical fiber formed of a nonlinear medium. When a light signal having a certain pulse amplitude ranging from a few picoseconds to a few tens picoseconds is transmitted through the optical fiber as a waveguide at an optical intensity greater than an amplitude of a few milliwatts, both the anomalous dispersion characteristics of the optical fiber and self phase modulation characteristics of the light signal having a great optical intensity can be utilized to transmit the light signal without distorting its optical waveform as a high-speed pulse and in a stable manner regardless of collisions between the light signals. A brief description will be given of the optical soliton transmission system below.

First, the anomalous dispersion characteristics of the optical fiber will be discussed. Even in the case of a homogeneous medium, a refractive index varies with a light wavelength, that is, the refractive index depends on the wavelength. As a result, the propagation velocity V of light varies with the wavelength thereof. Meanwhile, a light signal includes many wavelength components, since the wavelength of a light source used is generally not monochromatic and has a certain spectrum.

Therefore, with the optical propagation velocity varying with the wavelength, as the transmission distance becomes longer, the waveform of the light signal is distorted and the pulse width thereof becomes broader. This phenomenon is called dispersion. Particularly, the sum of material dispersion depending on the wavelength of the light signal and structural dispersion is referred to as chromatic dispersion.

In this case, The frequency of light shifts linearly with respect to transitional positions in a pulse. Specifically, at the leading edge of the pulse, since the frequency shifts to a short wavelength region, a group velocity becomes higher. In contrast, at the falling edge of the pulse, since the frequency shifts to a long wavelength region, the group velocity becomes lower. As a result, the pulse width of the light signal broadens.

Next, the self phase modulation of the light signal will be discussed below. First, when a magnetic field is applied to a dielectric material, the refractive index of the dielectric material changes according to the magnetic field. Then, as shown in the following equation (1), changes in the refractive index are set to be proportional to the square of an electric field (the optical Kerr effect).

$$\Delta n \propto |E|^2 \qquad (1)$$

In the above equation, the symbol n represents the refractive index of the dielectric material, and the symbol E represents an electric field. In general, the greater the amplitude of the light signal, the greater the changes $\Delta n$ in the refractive index, and the higher the refractive index n, the lower the propagation velocity V. (V=c/n: the symbol c represents the velocity of light in a vacuum.) Therefore, the optical intensity of the light signal causes changes in the refractive index, and phase modulation thereby occurs. As a consequence, the light frequency shifts. In the anomalous dispersion wavelength region, at the leading edge of the pulse, the group velocity becomes-lower and the frequency shifts to the short wavelength side. In contrast, at the falling edge of the pulse, the group velocity becomes higher and the frequency shifts to the long wavelength side. That is, the pulse width of the light signal is compressed.

In this way, when the pulse-width broadening of the light signal due to the anomalous dispersion of the optical fiber and the compression of the light signal due to the self phase modulation are kept in balance, the light signal can be transmitted over a long distance while maintaining a certain pulse waveform thereof. That is, the optical transmission can be performed without causing any pulse-waveform distortion. Moreover, an optical soliton has characteristics in which when passings or collisions between light signals occur, no fusion between the solitons occurs and the wave-packet thereof is never collapsed. As if nothing had happened, the solitons continue to propagate just the way they are. Furthermore, since the pulse waveforms of the light signals are not deteriorated, no intercode interference occurs between the output light signals.

FIG. 1 is a structural view showing an optical-soliton transmitting apparatus using the above-described optical soliton transmission system. Referring to FIG. 1, a description will be given of an optical-soliton transmitting apparatus 1.

The optical-soliton transmitting apparatus 1 shown in FIG. 1 includes an output unit 2, a drive signal generating unit 3, an optical fiber 4, a light receiving unit 5, an information signal generating unit 6, and the like. The drive signal generating unit 3 modulates the information signal PS sent from a signal source $ch_1$ into a drive signal PS, which drives the output unit 2. The output unit 2 is formed, for example, by a laser diode to convert the drive signal PS sent from the drive signal generating unit 3 into a light signal LP.

In this case, since the drive signal PS and the light signal LP have specified pulse widths and amplitudes in order to perform an optical soliton transmission. That is, the light signal LP output from the output unit 2 has a great optical intensity so as to perform the optical soliton transmission.

The optical fiber 4 formed of a material having anomalous dispersion characteristics has a structure based on the characteristics. The optical fiber 4 transmits the light signal LP generated by the output unit 2. The optical fiber 4 serves in such a manner that the light signal LP is sent to an end thereof and is then sent to the light receiving unit 5 from the other end thereof. In the optical fiber 4, an optical amplifier, which is not shown here, is disposed to prevent the optical soliton transmission from halting when the light signal LP is attenuated in the optical fiber 4.

The light receiving unit 5 is, for example, formed by a photo diode, and converts the light signal LP transmitted through the optical fiber 4 into drive signal PS. The drive signal PS obtained by the conversion is sent to the information signal generating unit 6, which demodulates the sent drive signal PS into the information signal IS to output.

Next, referring to FIG. 1, a description will be given of the operational example of the optical-soliton transmitting apparatus 1.

First, when an information signal IS from a signal source $ch_1$ is sent to the drive signal generating unit 3, the drive signal generating unit 3 converts the information signal IS into a drive signal PS. When the drive signal PS is sent to the output unit 2, the drive signal PS is converted into a light signal LP.

Then, the light signal LP is sent to the optical fiber 4 to be transmitted through the optical fiber 4. In this situation, the light signal generated by the output unit 2 is transmitted through the optical fiber 4 to the light receiving unit 5, without distorting the pulse waveform of the light signal owing to chromatic dispersion (anomalous dispersion) and self phase modulation.

After this, the light receiving unit 5 converts the light signal LP into a drive signal PS to transmit to the information signal generating unit 6. The information signal generating unit 6 demodulates the drive signal PS into the information signal IS to output.

In FIG. 1, the single information signal IS is transmitted from the single signal source $ch_1$. However, in the optical soliton transmission system, due to a demand for a larger capacity transmission, the implementation of information transmission with signal multiplexing is desired. As a result, there is provided a wavelength-multiplexing soliton-transmission system. In this system, an optical soliton transmission is implemented by using light signals having different wavelengths while multiplexing the wavelengths so as to achieve a large-capacity transmission.

However, when the wavelength-multiplexing soliton-transmission system is used, high precision in the use of laser beams output from an output unit, an optical filter, and the like, are required. Thus, there is a problem in that the above system has a limitation to multiplexing efficiency.

SUMMARY OF THE INVENTION

Accordingly, it is an object of the present invention to provide an optical communication system, an optical transmitting apparatus, an optical receiving apparatus, an optical communication method, and a storage medium, in which a large-capacity transmission can be performed at high speed with improved multiplexing efficiency so as to solve the problems describe above.

To this end, according to a first aspect of the present invention, there is provided an optical communication system including an optical transmitting apparatus for converting a plurality of information signals into light signals having different amplitudes according to the respective information signals by providing specified optical intensities permitting optical soliton transmissions to output the light signals, and an optical receiving apparatus having a function of identifying the respective information signals by the amplitudes of the respective light signals input via a transmitting medium having anomalous dispersion characteristics and connecting the optical transmitting apparatus and the optical receiving apparatus to demodulate the light signals into the plurality of information signals.

According to a second aspect of the present invention, there is provided an optical communication method for communicating via a transmitting medium having anomalous dispersion characteristics. The optical communication method includes the steps of converting a plurality of information signals into light signals having different amplitudes according to the respective information signals by providing specified optical intensities permitting optical soliton transmissions and outputting the light signals to the transmitting medium.

In each of the first and second aspects of the present invention, when information is transmitted via the transmitting medium, multiplexing transmission of light signals having different amplitudes is implemented in an optical fiber as the transmitting medium. As a result, with the transmission of optical solitons, a long-distance transmission can be achieved without causing any waveform distortions. Moreover, multiplexing of the light signals permits a large-capacity transmission to be implemented.

According to a third aspect of the present invention, there is provided an optical transmitting apparatus for converting information signals into light signals having specified optical intensities permitting optical soliton transmissions to output the light signals. The optical transmitting apparatus includes a drive signal generating unit for generating drive signals converting the plurality of information signals into the light signals having different amplitudes according to the plurality of information signals and an output unit for outputting the light signals based on the driving signals output from the drive signal generating unit.

In the arrangement of the third aspect of the invention, when the plurality of information signals are converted into the light signals to be output, the drive signal generating unit converts the plurality of information signals into drive signals having different amplitudes according to the respective information signals, and the output unit is driven by the drive signals to output the light signals. Accordingly, the output light signals also have different amplitudes according to the respective information signals. As a result, the individual output light signals corresponding to each of the information signals can be identified by the amplitudes.

In addition, according to a fourth aspect of the present invention, there is provided an optical receiving apparatus for demodulating a plurality of light signals transmitted by optical soliton transmissions into information signals. The optical receiving apparatus includes a light receiving unit for receiving the light signals and an information signal generating unit for generating the information signals based on the amplitudes of the light signals received by the light receiving unit.

In this arrangement, when the amplitude-multiplexed light signals transmitted from the transmitting medium are received by the light receiving unit, according to the amplitude of each of the received light signals, the information signal generating unit generates at least one information signal.

Furthermore, according to a fifth aspect of the present invention, there is provided a storage medium used for communicating via a transmitting medium having anomalous dispersion characteristics. The storage medium stores a program including a conversion step of converting a plurality of information signals into light signals having different amplitudes according to the respective information signals by providing specified optical intensities permitting optical soliton transmissions and an output step of outputting the light signals to the transmitting medium.

DESCRIPTION OF THE PREFERRED EMBODIMENTS

A detailed description will be given of preferred embodiments of the present invention with reference to the attached drawings.

The embodiments that will be described below as detailed examples suitable to the present invention are provided with some limitations that are technically preferable. However, the scope of the present invention is not limited to the embodiments below, as long as there is no particular description limiting the scope of the invention in the explanation given below.

Figure 1:
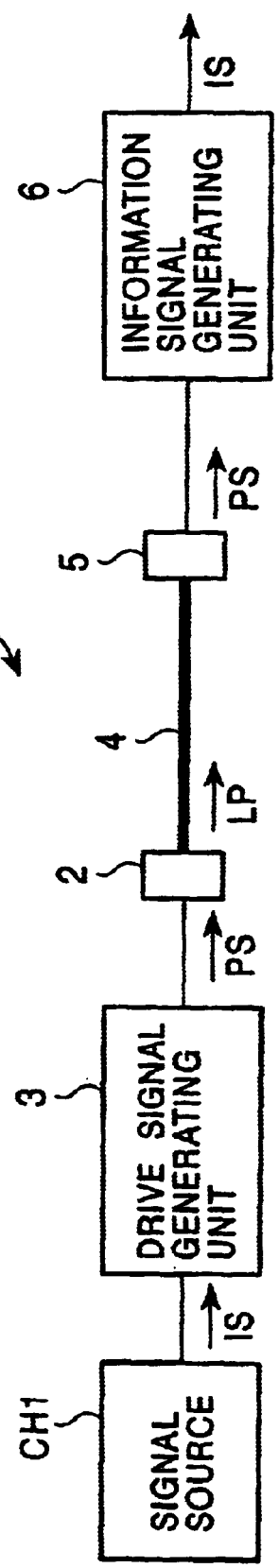
FIG. 1 is a structure view showing one example of an optical-soliton transmitting apparatus relating to the present invention.
Figure 2:
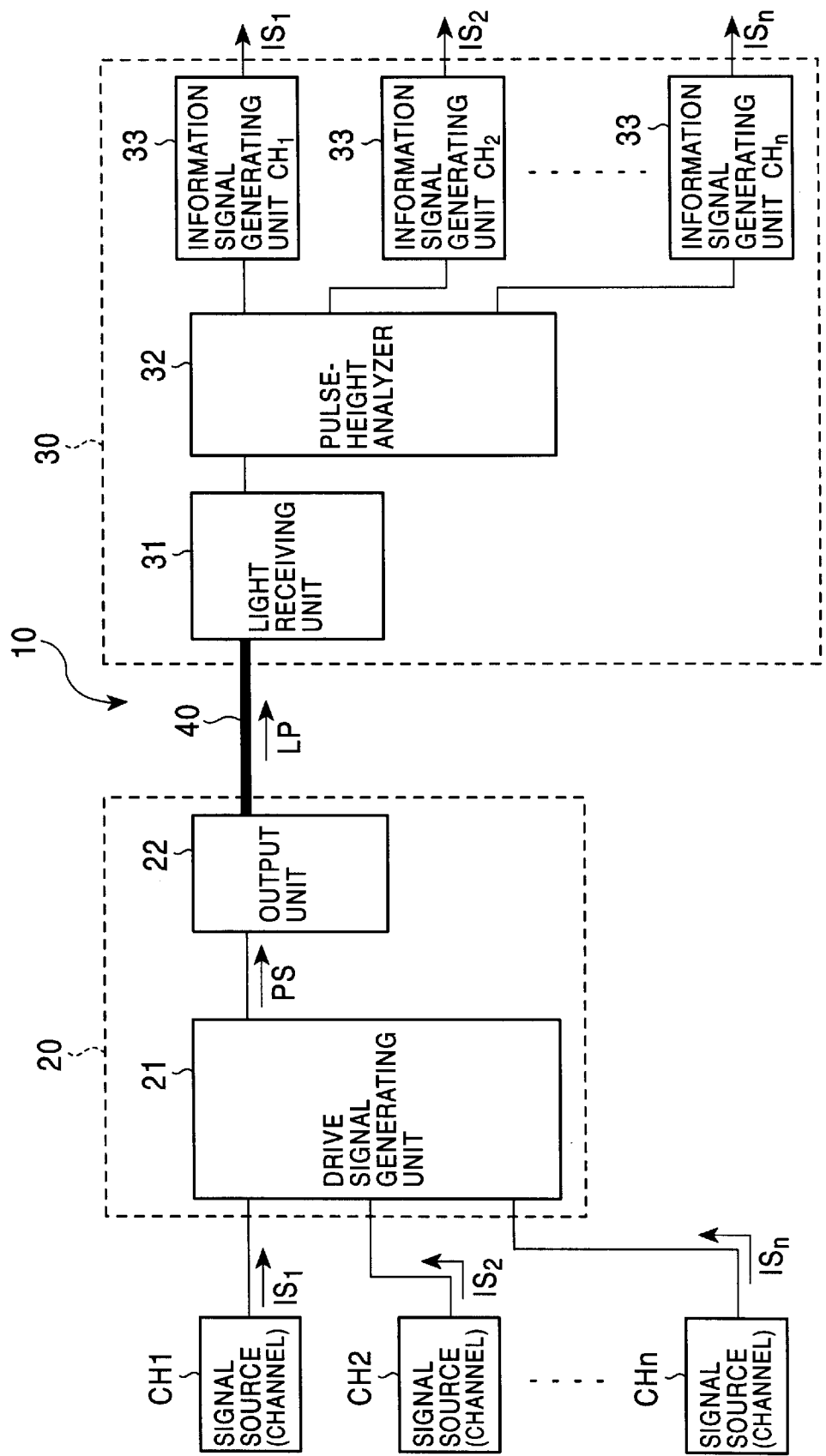
FIG. 2 is a structural view of an optical-soliton transmitting apparatus according to a first preferable embodiment of the present invention.

FIG. 2 shows a structural view of an optical communication system according to a first preferable embodiment of the present invention. Referring to FIG. 2, an optical communication system 10 will be illustrated.

The optical communication system 10 shown in FIG. 2 is constituted of an optical transmitting apparatus 20, an optical receiving apparatus 30, an optical fiber 40 as a transmitting medium, and the like.

The optical transmitting apparatus 20 converts a plurality of information signals $IS_1$ to $IS_n$ sent from a plurality of signal sources $ch_1$ to $ch_n$ into specified light signals LP to output the light signals LP to an end of the optical fiber 40. The optical receiving apparatus 30, which is optically connected to the other end of the optical fiber 40, receives the light signals LP transmitted by the optical fiber 40 to demodulate the light signals LP into the information signals $IS_1$ to $IS_n$. In addition, the optical fiber 40 may be made from a material such as silica based glass or plastic. That is, the optical fiber 40 made from such a material having anomalous dispersion characteristics has a structure based on the characteristics.

Now, a detailed explanation will be given of the optical transmitting apparatus 20 and the optical receiving apparatus 30 with reference to FIG. 2.

The optical transmitting apparatus 20 has a drive signal generating unit 21, an output unit 22, and the like. The drive signal generating unit 21 is connected to the plurality of signal sources (channels) $ch_1$ to $ch_n$, and has, for example, a function of modulating the plurality of information signals $IS_1$ to $IS_n$ sent from the plurality of signal sources $ch_1$ to $ch_n$ into drive signals PS formed of specified pulse signals.

The output unit 22, which may be formed by a laser diode, converts the drive signals PS into light signals to output the light signals LP to the optical fiber 40. As a result, the amplitudes and frequencies of the light signals LP depend on the drive signals PS.

In this case, the drive signals PS are generated in such a manner that "0" or "1" can be expressed depending on whether or not there are pulses determined both by the gain of the optical fiber 40 and the amplitudes (pulse heights) of the drive signals PS of the drive signal generating unit 21, in specified periods of time based on the information signals $IS_1$ to $IS_n$. In addition, an example will be provided to identify the respective pulse amplitudes of the drive signals PS output from the respective signal sources $ch_1$ to $ch_n$ as follows. In the example below, the pulse amplitude of each of the drive signals PS, which is denoted by the symbol $A_n$, is set in such a manner that the following equation (2) holds based on the plurality of signal sources $ch_1$ to $ch_n$.

$$A_n = 2^{n-1} \times A_0 \qquad (2)$$

In this equation, $A_0$ represents a fundamental amplitude necessary for an optical soliton transmission, and n represents the channel number (a natural number) corresponding to the signal sources $ch_1$ to $ch_n$. The rationale of the equation (2) will be discussed below.

Figure 3A:
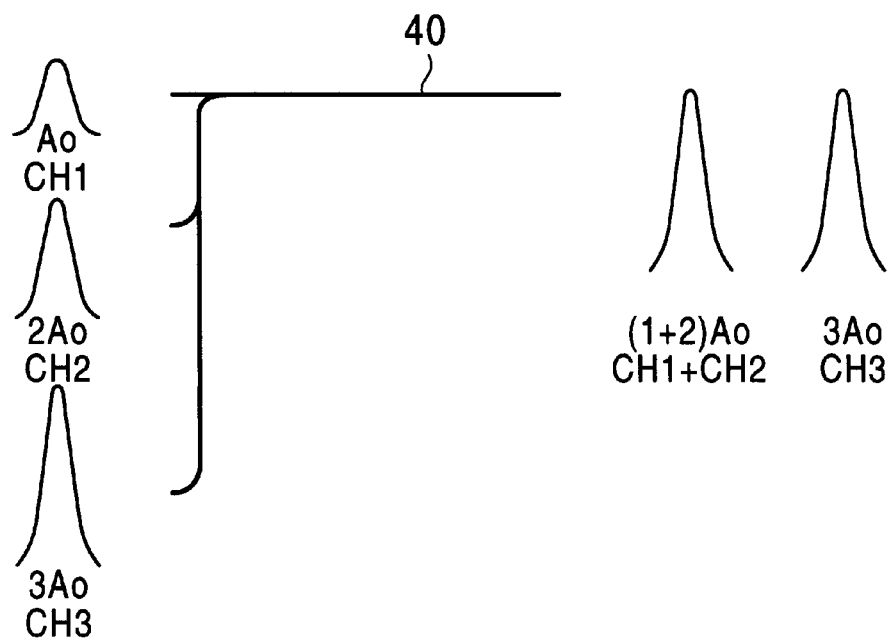
FIGS. 3A and 3B show view illustrating the examples of pulse signals and light signals generated in the optical-soliton transmitting apparatus of the invention.
Figure 3B:
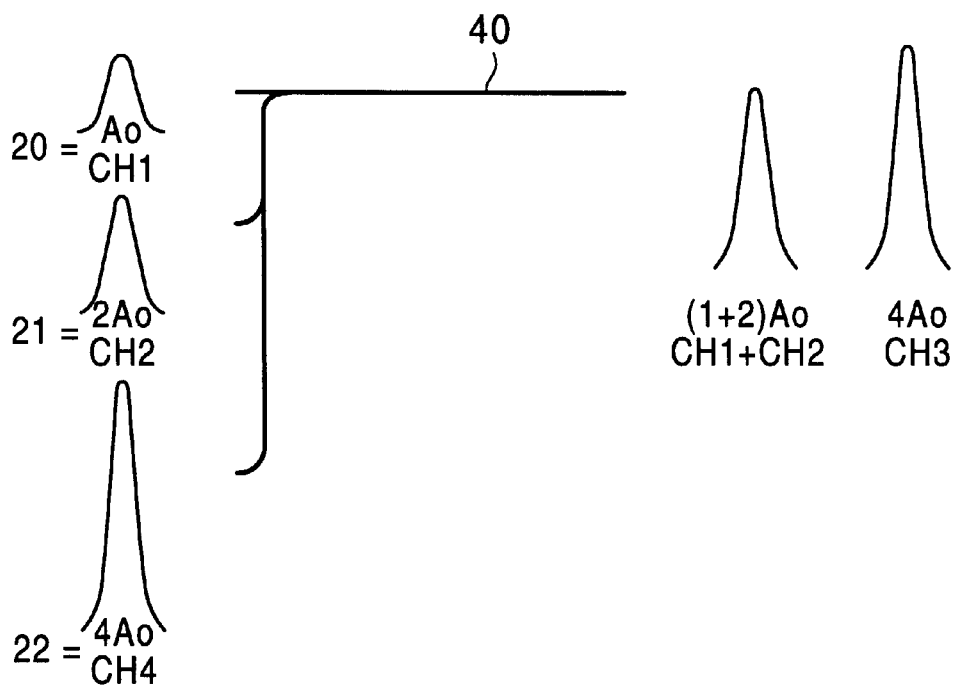

FIGS. 3A and 3B show examples of the drive signals PS generated based on the plurality of information signals $IS_1$ to $IS_n$ sent from the plurality of signal sources $ch_1$ to $ch_n$.

For example, as shown in FIG. 3A, it is assumed that the amplitude of each drive signal PS (light signal LP) satisfies an equation $A_n = n \times A_0$ (n represents a channel number). For example, when both of the information signal $IS_1$ from the signal source $ch_1$ and the information signal $IS_2$ from the signal source $ch_2$ are simultaneously output to the drive signal generating unit 21, the amplitude $A_{PS}$ of the drive signals PS generated by the drive signal generating unit 21 is equivalent to the sum of the signal source $ch_1$ (in which the pulse amplitude $A_1$ is equal to $A_0$) and the signal source $ch_2$ (in which the pulse amplitude $A_2$ is equal to $2A_0$), that is, $A_{ps}$ is equal to $3A_0$. Meanwhile, the pulse amplitude $A_3$ of a drive signal PS generated based on the information signal $IS_3$ sent from the signal source $ch_3$ is also equal to $3A_0$. Thus, a pulse-height analyzer 32, which will be described below, cannot identify from which of the signal sources $ch_1$ to $ch_n$ the pulse amplitude corresponding to the drive signal output is output.

In contrast, as shown in FIG. 3B, it is assumed that the amplitude A of a drive signal PS is set in a manner satisfying the above equation (2) based on the plurality of signal sources (channels) $ch_1$ to $ch_n$. In this situation, similarly, when both the information signal $IS_1$ and the information signal $IS_2$ are simultaneously output to the drive signal generating unit 21, based on the above equation (2), the amplitude $A_{PS}$ of the drive signals PS generated by the drive signal generating unit 21 is equivalent to the sum of the pulse amplitude $A_0$ ($A_1 = A_0$) and the pulse amplitude $2A_0$ ($A_2 = 2A_0$), that is, $3A_0$.

Meanwhile, the pulse amplitude $A_3$ of the signal source $ch_3$ is equal to $4A_0$ based on the above equation (2). This result is different from the amplitude $A_{LP}$ of the multiplexed light signals LP, that is, the amplitude $A_{PS}$ of the drive signals PS above. Therefore, no matter how many light signals LP are multiplexed, no equal pulse amplitudes $A_{PS}$ are generated. Therefore, the multiplexed light signals LP can be identified or isolated without fail.

Next, the optical receiving apparatus 30 will be illustrated with reference to FIG. 2.

The optical receiving apparatus 30 has a light receiving unit 31, the pulse-height analyzer 32, a plurality of information signal generating units 33, and the like. The light receiving unit 31 converts a light signal LP sent from the optical fiber 40 into a drive signal PS, and then sends the drive signal PS to the pulse-height analyzer 32.

The pulse-height analyzer 32 detects the pulse amplitude $A_{PS}$ of the drive signal PS to identify from which of the signal sources $ch_1$ to $ch_n$ the detected pulse amplitude $A_{PS}$ is output. In other words, the signal source of the pulse amplitude $A_{LP}$ of the light signal LP (the drive signal PS) sent from the optical transmitting apparatus 20 is identified in advance in the pulse-height analyzer 32 of the optical receiving apparatus 30.

In addition, for example, when the plurality of information signals $IS_1$ to $IS_n$ are simultaneously output to the drive signal generating unit 21, or when the light signals LP simultaneously reach the light receiving unit 31 due to the difference between the propagation velocities of the plurality of information signals $IS_1$ to $IS_n$, based on the above-described equation (2), the pulse-height analyzer 32 has a function of identifying from which of the signal sources $ch_1$ to $ch_n$ an individual signal $IS_a$ ($1 \leq a \leq n$) of the information signals is output to sent the individual drive signal PS from the light receiving unit 31 to the information signal generating unit 33 corresponding to a channel as the identified signal source. The corresponding information signal generating unit 33 has a function of demodulating the sent drive signal PS into a relevant information signal.

Figure 4:
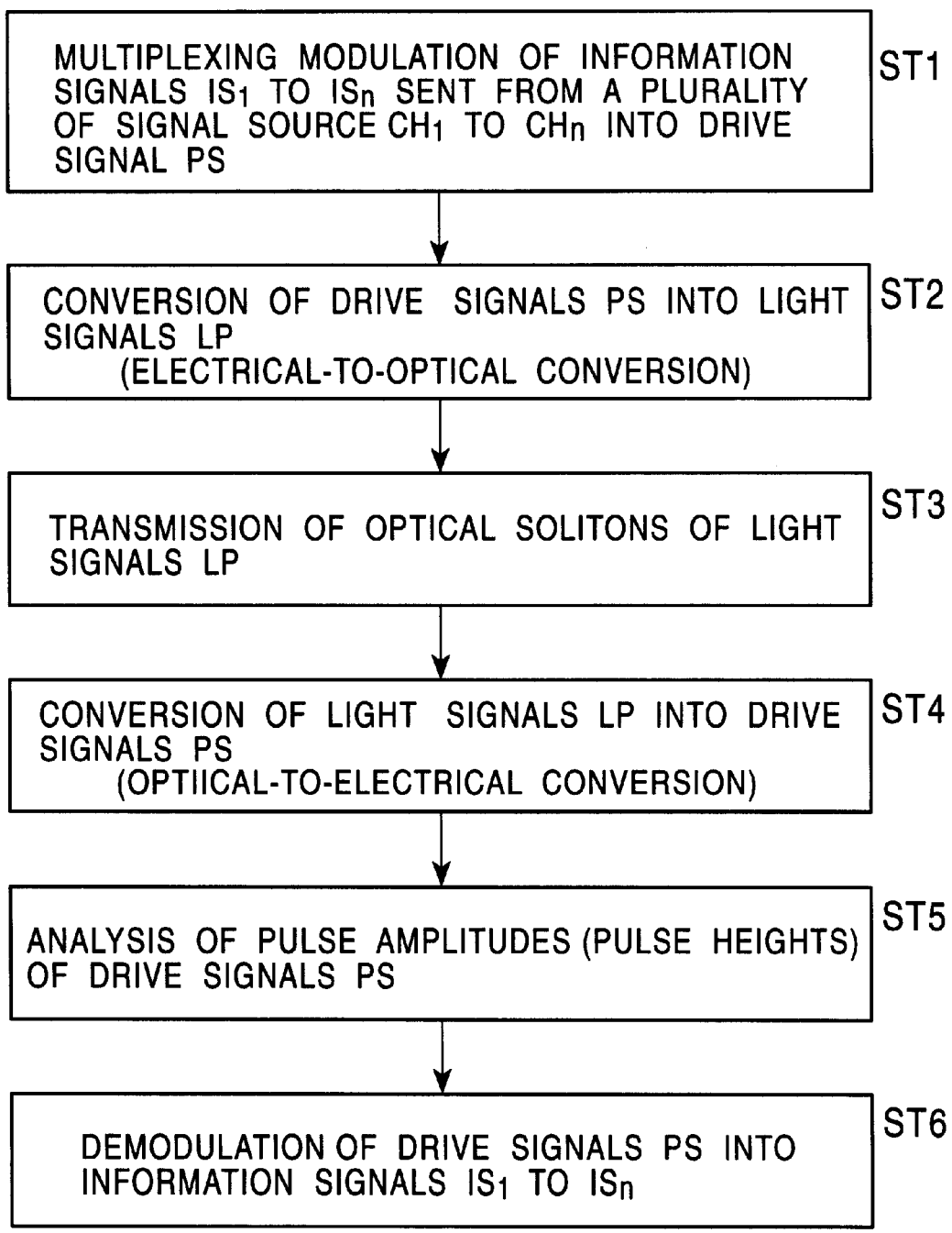
FIG. 4 is a flow chart illustrating an optical-soliton transmitting method according to a preferable embodiment of the invention.

Next, FIG. 4 is a flow chart of the optical-soliton transmitting method according to the first preferable embodiment of the present invention. Referring to FIGS. 2 to 4, the optical-soliton transmitting method will be described below.

First, in step 1, the information signals $IS_1$ to $IS_n$ to be transmitted from the plurality of signal sources $ch_1$ to $ch_n$ shown in FIG. 2 are sent to the drive signal generating unit 21, which modulates the sent information signals $IS_1$ to $IS_n$ into drive signals PS. In this case, the pulse amplitude $A_{PS}$ of each of the drive signals PS is generated in such a manner that the pulse amplitude $A_{PS}$ matches a specified pulse-amplitude train according to each of the signal sources $ch_1$ to $ch_n$, as shown in the above equation (2).

In step 2, based on the generated drive signals PS, the output units 22 are driven to convert the drive signals PS into light signals LP. In this situation, similarly, the light signals LP are also generated in such a manner that the light signals LP have different pulse amplitudes according to the respective signal sources $ch_1$ to $ch_n$.

In step 3, the optical-soliton transmitting method permits the light signals LP to be transmitted through the optical fiber 40 without causing any waveform distortions and to be sent to the light receiving unit 31. Additionally, there may be a case in which the light signals LP are amplified by an optical amplifier, which is not shown here.

In step 4, when the light signals LP are sent to the light receiving unit 31, the light receiving unit 31 converts the light signals LP into drive signals PS to sent to the pulse-height analyzer 32.

In step 5, the pulse-height analyzer 32 detects the pulse height $A_{PS}$ of each of the sent drive signals PS to identify the signal source of the drive signals PS. Furthermore, when the plurality of drive signals PS is simultaneously sent to the pulse-height analyzer 32, the pulse-height analyzer 32 analyzes the plurality of drive signals PS according to the respective signal sources $ch_1$ to $ch_n$ to identify from which of the signal sources $ch_1$ to $ch_n$ each of the plurality of drive signals PS is output.

In step 6, the pulse-height analyzer 32 sends the individual drive signal PS to the information signal generating unit 33 specified based on the amplitude of the individual drive signal PS. The specified information signal generating unit 33 converts the sent drive signal PS into the equivalent information signal of the information signals $IS_1$ to $IS_n$.

As shown above, the soliton transmitting method with the pulse-amplitude multiplexing can provide a communication path in which a large-capacity transmission can be implemented at high speed, which is equivalent to a plurality of soliton-communication paths.

Moreover, according to the respective information signals $IS_1$ to $IS_n$ sent from the plurality of signal sources $ch_1$ to $ch_n$, since there is set a pulse-amplitude train in which the individual pulse amplitude can identically be taken out from the multiplexed pulse amplitudes, efficiency in the multiplexing transmission can be enhanced. With the enhanced multiplexing efficiency, the transmission capacity can be increased, thereby leading to reduction in cost per unit capacity.

Figure 5:
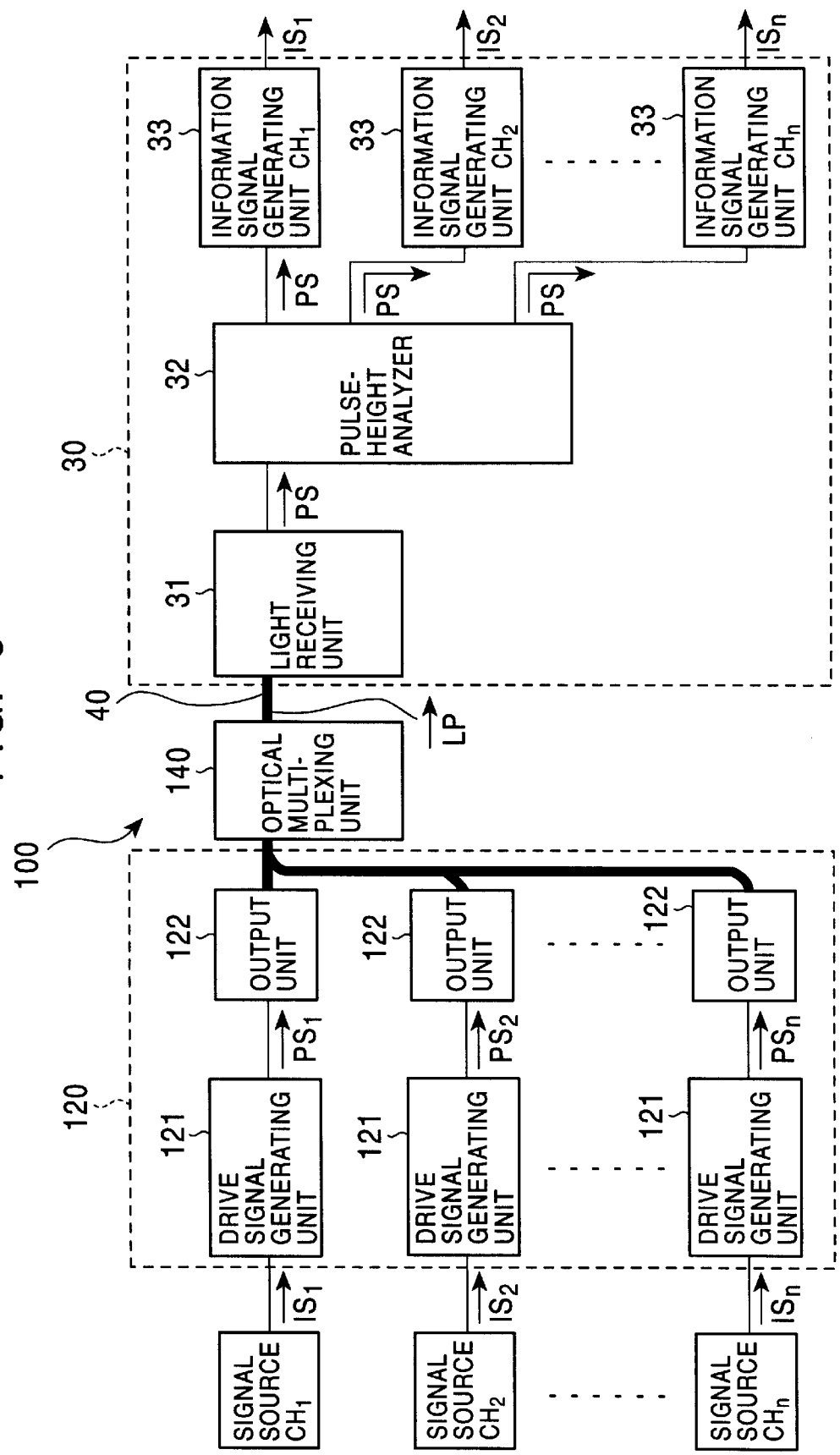
FIG. 5 is a structure view of an optical-soliton transmitting apparatus according to a second preferable embodiment of the present invention.

FIG. 5 is a structure view of an optical-soliton transmitting apparatus according to a second embodiment of the present invention. Referring to FIG. 5, a description will be given of an optical-soliton transmitting apparatus 100. In the optical-soliton transmitting apparatus 100 shown in FIG. 5, the same reference numerals are given to parts having substantially the same structures as those in the optical-soliton transmitting apparatus 10 shown in FIG. 2, and the explanation thereof is omitted.

The optical-soliton transmitting apparatus 100 shown in FIG. 5 includes an optical transmitting apparatus 120 having a structure different from that of the optical-soliton transmitting apparatus 10 shown in FIG. 2. In FIG. 5, the optical transmitting apparatus 120 has a plurality of drive signal generating units 121, a plurality of output units 122, and the like.

The plurality of drive signal generating units 121 is disposed for each of signal source channels $ch_1$ to $ch_n$, respectively. Each of the plurality of drive signal generating units 121 generates drive signals $PS_1$ to $PS_n$ having different pulse amplitudes based on information signals $IS_1$ to $IS_n$ sent from the plurality of signal sources $ch_1$ to $ch_n$. In this situation, the individual drive signal generating unit 121 generates the drive signals $PS_1$ to $PS_n$, for example, in such a manner that the individual pulse height matches a pulse-amplitude train obtained by the aforementioned equation (1).

In addition, the individual drive signal generating unit 121 is connected to the corresponding output unit 122. The individual output unit 122 has a function of converting the drive signal PS supplied from the connected drive signal generating unit 121 into a light signal LP.

Furthermore, an optical multiplexing unit 140 is arranged between the plurality of output units 122 and the optical fiber 40. The optical multiplexing unit 140 has a function of multiplexing the light signals output from the plurality of output units 122.

In this way, by arranging the individual drive signal generating unit 121 and the individual output unit 122 for each of the signal source channels $ch_1$ to $ch_n$, the processing of generating the light signal LP is independently performed according to each of the signal source channels $ch_1$ to $ch_n$, and after that, the light signals LP are transmitted through the optical fiber 40. With this arrangement, the pulse amplitudes $A_{LP}$ of the multiplexed light signals LP can be easily analyzed. In other words, even when the information signals $IS_1$ to $IS_n$ are simultaneously output from the plurality of signal source channels $ch_1$ to $ch_n$, the individual drive signal generating unit 121 and the individual output unit 122 arranged for each of the signal source channels $ch_1$ to $ch_n$ convert the signals into the light signals LP. Therefore, without using any pulse-amplitude trains set by the aforementioned equation (2), the multiplexing transmission can be implemented without fail.

Figure 6:
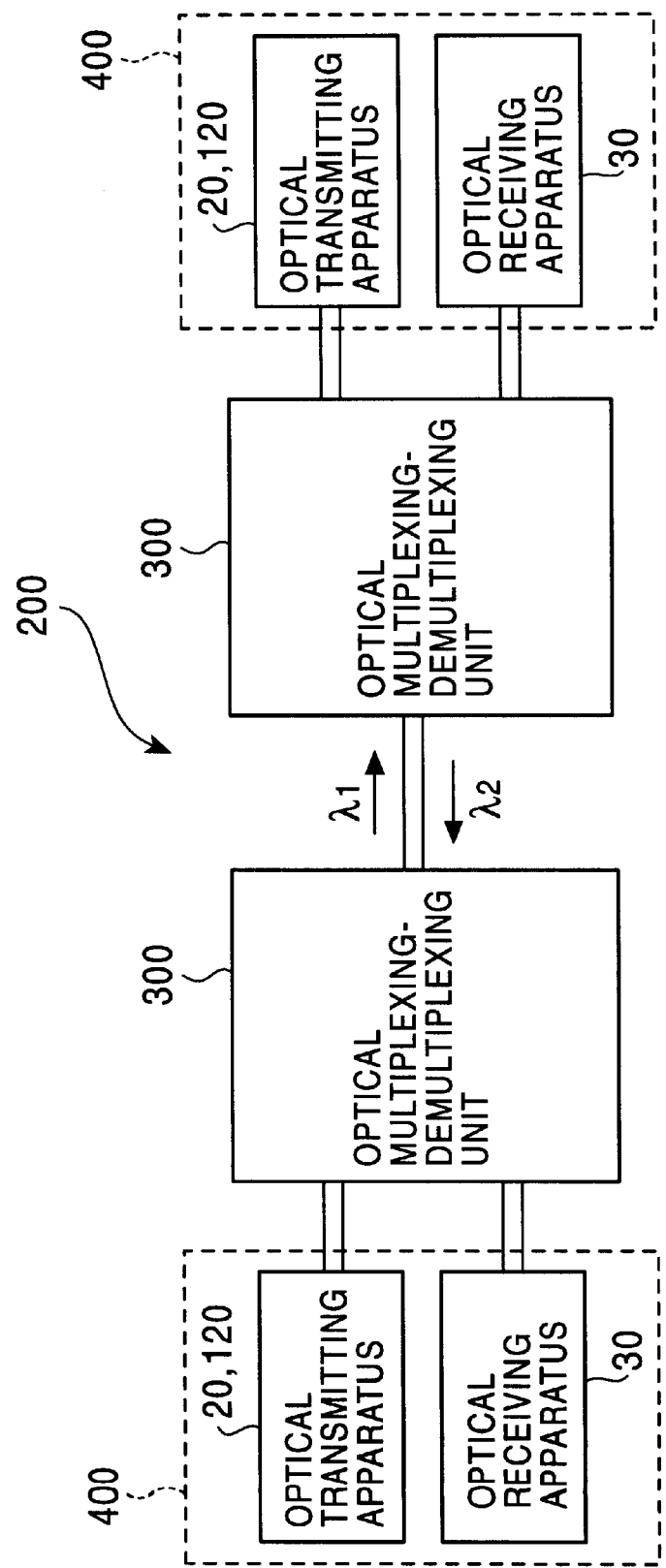
FIG. 6 is a structure view of an optical-soliton transmitting apparatus according to a third preferable embodiment of the present invention.

FIG. 6 is a structure view of an optical-soliton transmitting apparatus according to a third preferable embodiment of the present invention. Referring to FIG. 6, a description will be given of an optical-soliton transmitting apparatus 200. In the optical-soliton transmitting apparatus 200 shown in FIG. 6, the same reference numerals are given to parts having substantially the same structures as those in the optical-soliton transmitting apparatus 10 shown in FIG. 2, and the explanation thereof is omitted.

Unlike the optical-soliton transmitting apparatus 10 shown in FIG. 2, the optical-soliton transmitting apparatus 200 shown in FIG. 6 performs bidirectional transmissions. In FIG. 6, on each side of an optical fiber 40 are arranged an optical multiplexing-demultiplexing unit 300, and an optical-soliton transmitting-receiving apparatus 400. The optical-soliton transmitting-receiving apparatus 400 is constituted of an optical transmitting apparatus 20 (120), an optical receiving apparatus 30 (130), and the like.

The individual optical multiplexing-demultiplexing unit 300 supplies a light signal LP transmitted by an optical soliton transmission through the optical fiber 40 to the individual optical receiving apparatus 30 (130), and a light signal LP output from the individual optical transmitting apparatus 20 (120) is sent to the optical fiber 40.

In addition, light signals LP 1 and LP 2 (drive signals PS 1 and PS 2) output from the respective optical-soliton transmitting apparatuses 400 disposed on both sides of the optical fiber 40 are generated, for example, in such a manner that the light signals LP 1 and LP 2 have different wavelengths or different fundamental amplitudes.

With this arrangement, the bidirectional optical soliton transmission can be performed through the optical fiber 40, with the result that a communication path permitting a large-capacity transmission can be obtained.

Accordingly, in each of the above embodiments, by using nonlinearity of the optical fiber 40 used for ultra-fast communications, the light signals LP having multiplexed amplitudes are transmitted. With this arrangement, since the signals from the independent signal sources (communication channels) $ch_1$ to $ch_n$ can be multiplexed in the same optical fiber 40, communication capacity can be increased.

Moreover, in the amplitude multiplexing of the light signals LP, since the pulse-amplitude train of the light signals LP used for each of the signal sources $ch_1$ to $ch_n$ as shown in the equation (2) is set to be a specified pulse-amplitude train, the isolation of the light signals LP can be easily and appropriately performed. Furthermore, since the individual drive signal generating unit 121 and individual the output unit 122 are arranged for the respective signal sources $ch_1$ to $ch_n$, the isolation of the light signals LP can be further facilitated.

In addition, when the above-described series of processing are performed by using software, a program constituting the software is stored in a storage medium disposed in the optical-soliton transmitting apparatus, the optical transmitting-receiving apparatus, or the optical communication system.

Figure 7:
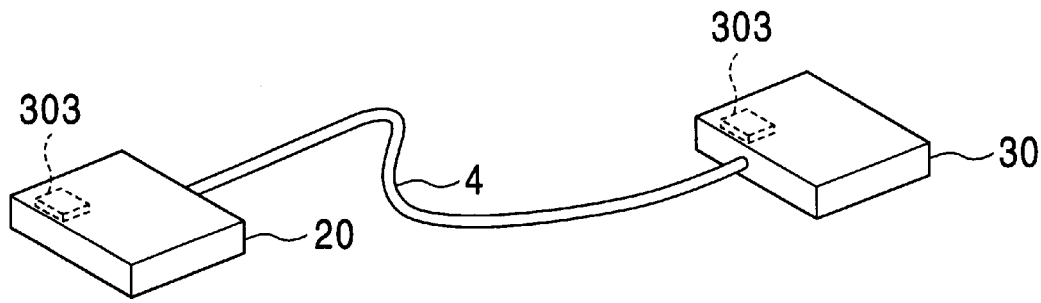
FIG. 7 is a view illustrating a storage medium storing a program for implementing the present invention.
Figure 8A:
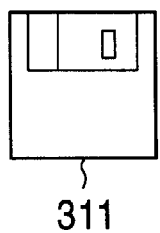
FIGS. 8A to 8F are other views illustrating storage mediums, each storing the program for implementing the present invention.
Figure 8B:
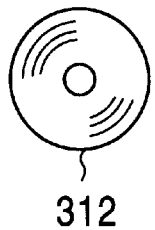
Figure 8C:
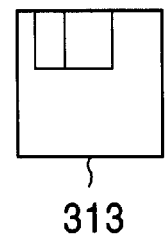
Figure 8D:
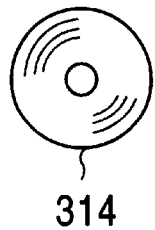
Figure 8E:
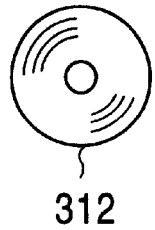
Figure 8F:
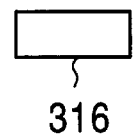

Referring now to FIG. 7, a description will be given of the storage medium storing the program for performing the series of processing described above.

As shown in FIG. 7, the program is provided to users in a state in which the program is stored in advance in a semiconductor memory 303 as a storage medium contained in an optical transmitting apparatus 20.

Alternatively, the program may be provided as a package of software, as shown in FIGS. 8A to 8F, by storing temporarily or permanently in a storage medium such as a floppy disk 311, a compact disk-read only disk (CD-ROM) 312, a magneto-optical (MO) disk 313, a digital versatile disk (DVD) 314, a magnetic disk 315, or a semiconductor memory 316.

It should be noted that the storage medium described in the present specification is provided based on broader concepts including the above all mediums.

The optical transmitting apparatus 20 and the optical receiving apparatus 30 respectively contains a central processing unit (CPU), which is not shown in the figure. The individual CPU runs a program stored in the semiconductor memory 303 shown in FIG. 7, (for example, in a read only memory). Or, the optical transmitting apparatus 20 and the optical receiving apparatus 30 respectively may have a drive. A program is read out from the floppy disk 311, the CD-ROM 312, the MO disk 313, the DVD 314, or the magnetic disk 315, disposed in the drive to load into a random access memory (RAM), which is not shown, so as to run the program.

In the present specification, the steps for describing the program provided by the storage medium include, in addition to the series of processing performed in time sequence according to the described order, a series of processing performed parallel or separately even when the steps are not necessarily performed in time sequence.

The embodiments of the present invention are not limited to the above-described embodiments.

For example, in FIGS. 2, 5, and 6, although the information signal generating unit 33 is arranged for each of the signal sources $ch_1$ to $ch_n$, only a single information signal generating unit 33 may be arranged to demodulate the information signals $IS_1$ to $IS_n$ sent from the signal sources $ch_1$ to $ch_n$.

As describe above, the present invention can provide the optical-soliton transmitting apparatus, the optical transmitting apparatus, the optical receiving apparatus, the optical-soliton transmitting method, and the storage medium, which can implement a large-capacity transmission at high speed and can improve multiplexing efficiency.

While the invention has been described in its preferred embodiments, it will be obvious to those skilled in the art that various changes and modifications may be made without departing from the scope and spirit of the appended claims in the invention.

What is claimed is:

1. An optical communication system comprising:

an optical transmitting apparatus for converting a plurality of information signals into light signals having different amplitudes according to the respective information signals by providing specified optical intensities permitting optical soliton transmissions to output the light signals; and an optical receiving apparatus having a function of identifying the respective information signals by the amplitudes of the respective light signals input via a transmitting medium having anomalous dispersion characteristics and connecting the optical transmitting apparatus and the optical receiving apparatus to demodulate the light signals into the plurality of information signals, wherein the optical transmitting apparatus converts the information signals into the light signals in such a manner that the sum of the amplitudes of any of the individual light signals differs from the amplitude of any other light signals.

2. An optical communication system according to claim 1, wherein the optical transmitting apparatus converts the information signals into the light signals in such a manner that, of the plurality of light signals, the light signal of a channel n has an amplitude $A_n$ satisfying the equation $A_n = 2^{n-1} \times A_0$, in which n is a natural number and $A_0$ represents a fundamental amplitude necessary for the optical soliton transmission.

3. An optical transmitting apparatus for converting information signals into light signals having specified optical intensities permitting optical soliton transmissions to output the light signals, the optical transmitting apparatus comprising:

drive signal generating means for generating drive signals converting the plurality of information signals into the light signals having different amplitudes according to the plurality of information signals; and output means for outputting the light signals based on the driving signals output from the drive signal generating means, wherein the drive signal generating means converting the information signals into the light signals in such a manner that the sum of the amplitudes of any of the individual light signals differs from the amplitude of any other light signal.

4. An optical transmitting apparatus for converting information signals into light signals having specified optical intensities permitting optical soliton transmissions to output the light signals, the optical transmitting apparatus comprising:

drive signal generating means for generating drive signals converting the plurality of information signals into the light signals having different amplitudes according to the plurality of information signals; and output means for outputting the light signals based on the driving signals output from the drive signal generating means, wherein the drive signal generating means and the output means are disposed for each of the plurality of information signals, wherein the drive signal generating means converts the information signals into the light signals in such a manner that, of the plurality of light signals, the light signal of a channel n has an amplitude $A_n$ satisfying the equation $A_n = 2^{n-1} \times A_0$, in which n is a natural number and $A_0$ is a fundamental amplitude necessary for the optical soliton transmission.

5. An optical communication method for communicating via a transmitting medium having anomalous dispersion characteristics, the optical communication method comprising the steps of:

converting a plurality of information signals into light signals having different amplitudes according to the respective information signals by providing specified optical intensities permitting optical soliton transmissions; and outputting the light signals to the transmitting medium, wherein, in the converting step, the information signals are converted into the light signals in such a manner that the sum of the amplitudes of any of the individual light signals differs from the amplitude of any other light signal.

6. An optical communication method according to claim 5, wherein the information signals are converted into the light signals in such a manner that, of the plurality of light signals, the light signal of a channel n has an amplitude $A_n$ satisfying the equation $A_n = 2^{n-1} \times A_0$, in which n is a natural number and $A_0$ represents a fundamental amplitude necessary for the optical soliton transmission.

* * * * *